United States Patent [19]

Avelar

[11] Patent Number: 5,071,478

[45] Date of Patent: Dec. 10, 1991

[54] FIRE-RETARDANT COMPOSITION

[76] Inventor: Frederick C. Avelar, 19025 La Fetra Dr., Glendora, Calif. 91740

[21] Appl. No.: 603,413

[22] Filed: Oct. 26, 1990

[51] Int. Cl.⁵ .................. C09D 5/18; C09K 21/02
[52] U.S. Cl. .................. 106/18.13; 106/18.26; 106/18.27; 428/921
[58] Field of Search .............. 106/18.13, 18.26, 18.27; 428/921

[56] References Cited

U.S. PATENT DOCUMENTS

| | | | |
|---|---|---|---|
| 2,381,487 | 8/1945 | Cook et al. | 106/18.27 |
| 3,718,615 | 2/1973 | Woods et al. | 106/18.13 |
| 4,132,655 | 1/1979 | Draganov | 106/18.13 |

FOREIGN PATENT DOCUMENTS 2945597  5/1981  Fed. Rep. of Germany ... 106/18.13

Primary Examiner—William R. Dixon, Jr.
Assistant Examiner—Anthony J. Green
Attorney, Agent, or Firm—Matthew F. Jodziewicz

[57] ABSTRACT

A coating composition suitable for application to a substrate for curing thereon to form a fire-retardant coating, comprising in combination an aqueous emulsion containing a mixture of sulfate of ammonia, hydrate alumina and zinc borate. The dry weight of the mixture is in the range between 35 to 45 parts to one hundred parts of the composition. The dry weight ratio of sulfate of ammonia to hydrated alumina in the mixture is not less than 4.5 to 1. The dry weight ratio of hydrated alumina to zinc borate in the mixture is about equal.

19 Claims, No Drawings

FIRE-RETARDANT COMPOSITION

BACKGROUND OF THE INVENTION

1. Field of the Invention

This invention relates in general to fire-retardants, and, more particularly, to a composition which may be utilized as a paint additive, or used alone, to coat or impregnate surfaces to create a fire-retarding barrier thereon or therein.

2. Description of the Related Art

Fire ranks as a number one killer of individuals and a destroyer of property. Once ignited, combustion spreads quickly to engulf all available combustible materials. In many instances, such combustion produces not only toxic fumes, but exhausts all oxygen from the local environment, thereby causing not only poisoning of any individuals trapped within the area, but also asphyxiating them as well. With such a double danger, most trapped individuals succumb not to the flames themselves, but to the by-products of the combustion procedure itself.

A distinction should be made among fire or flame resistance and fire or flame retardancy. For purposes of the present invention, flame-resistant materials are defined as those that will not burn on contact with a flame, or if ignited, will not propagate the flame. For example, under ordinary atmospheric, temperature and pressure conditions, ceramic, cementitious and structural metal materials are considered to be flame resistant.

Fire retardant materials, for purposes of the present invention, are those that when exposed to a flame in an appropriate, oxidizing atmosphere, will ignite, but will propagate the flame reluctantly or very slowly. Examples of such materials that are old in the art, are synthetic polymer-based formulations that produce polymeric coatings on flammable substrates to inhibit flame spread.

Such known coatings as are based upon silicone rubbers or fluorocarbons impart good fire retardancy, but tend to be expensive and do not adhere well to many substrates. Coatings based on epoxy resins tend to be rigid and are difficult to apply, at least in the field, in a thin layer to a substrate. Phenolic-based formulations tend to form a rigid char that does not adhere well. Polyurethanes, in addition to exhibiting poor thermal stability, may form toxic degradation products upon exposure to flames.

The problem of searching for improved materials for reduction of flame spread and the prevention or reduction of the danger of "flash over", has been a main goal of such diverse industries as the wood shake roofing industry and various local and federal government agencies.

Many of the studies currently underway have attempted to find a way in which existing structures and materials can be made fire-retardant so as to provide a product and/or a method that would encourage individuals to upgrade the safety of a structure at a minimum of cost and inconvenience.

Laws have been passed to require that fire-retardant materials be used in construction whenever possible, and in fire prone drought areas actually prohibiting the use of combustible materials. Insurance companies have also recently begun to grant premium reductions to structures built with fire-retardant materials.

All of these actions have been taken in an attempt to encourage research and safe construction utilizing fire-retardant materials, thus indicating that there is a current need for an improved fire-retardant coating.

It is, therefore, an object of the present invention to provide an improved fire-retardant coating composition that can be applied to various flammable substrates to provide reduced flame spread.

It is another object of the present invention to provide a coating composition of the character described, which composition exhibits good adhesion to a variety of substrates, provides regulated gas escape, and assists in the formation of non-burning char.

Still a further object of the present invention is to provide a coating composition of the character described that is relatively inexpensive, has good environmental stability and can be prepared and applied with ease using conventional equipment. Other objects of the present invention will in part be obvious and will in part appear hereinafter.

The invention, therefore, comprises the composition possessing the features, properties and the constituents, and the article of manufacture possesses the characteristics, properties and relation of elements, all as exemplified in the detailed disclosure hereinafter set forth and the scope of the invention of which will be indicated in the claims.

The present invention is embodied in a chemical composition that, in one form, is suitable as an additive for use with existing paints to form a fire-retardant barrier on the painted surface that blends in with, and, in many instances, enhances the texture of a paint. In a clear form, the composition can be used to coat or impregnate wood, or other combustible materials, prior to use in construction by spraying the wood with the composition and allowing it to penetrate into the wood. The composition can also be impregnated into many construction materials by a pressurized system.

Accordingly, in one aspect of the present invention, there is provided a coating composition suitable for application to a flammable substrate for forming thereon a fire-retardant coating. The composition generally comprises an intimate mixture of a water emulsion of sulfate of ammonia, hydrated alumina and zinc borate, the dry weight of the mixture to one hundred parts of the composition being in the range between 10 to 50 parts. The dry weight ratio of sulfate of ammonia to hydrated alumina in the mixture is not less than 3.0 to 1. The dry weight ratio of hydrated alumina to zinc borate in the mixture being about equal.

The formulation preferably also optionally contains a thickener to maintain the powdered material in suspension, and an agent to impart fluidity and enhance dispersing action.

The foregoing fluid composition possesses a number of advantageous characteristics over existing formulations. Because it is water based, the coating equipment used to apply it to a substrate can be cleaned simply with soap and water and requires no expensive, possibly toxic or explosive, organic cleaning solvents. The composition of the invention dries at room temperature in a manner quite similar to the drying of latex, acrylic latex, or enamel water base paints, and forms a flexible coat that can, within reasonable limits, expand, contract and bend with the substrate.

The formulation is prepared by thoroughly mixing the sulfate of ammonia, preferably in emulsion or latex form, with the inorganic powder, water and the thickening and dispersing agents. The sulfate of ammonia is added to the aqueous emulsion in a dry weight amount that can vary from about 7.0 to 24 parts per hundred of the final composition, while the preferred dry weight amount of sulfate of ammonia will be in the range of 14.5 to 24 parts per hundred of the final composition. The inorganic powders are hydrated alumina and zinc borate, added in a dry weight amount that can vary from as little as 2.5 to 13 parts per hundred of the final composition, while the preferred weight ratios for hydrated alumina and zinc borate is about 8 to 13 parts per one hundred parts of composition.

A known thickener such as cross linked acrylic copolymer emulsion, gum, cellulose derivative or the like, is used to limit settling of the powder and to control viscosity is preferred that the thickening agent be used in a ratio, by dry weight, of between approximately 0.2 to 1 part per hundred of the composition.

A preferred dispersing agent used is an alkali salt of a carboxylate polyelectrolyte, which when mixed in the composition in minor and discretionary amounts serves to enhance dispersion of the inorganic powder throughout the mixture and to impart fluidity to the mixture. In this mixture, the use of zinc borate imparts a significant reduction in flame response over the use of the sulfate ammonia binder alone or the binder mixed with only hydrated alumina.

In a preferred embodiment, an aqueous emulsion of sulfate of ammonia is compounded with the thickener, typically an acrylic emulsion, in a ratio, by weight, of about 20:1, but this ratio can vary between about 10:1 to 50:1. A typical composition of the present invention of 100 parts by weight of the final composition, generally comprises in combination an aqueous emulsion containing a mixture of sulfate of ammonia, hydrated alumina and zinc borate, where the dry weight of the mixture is in the range between 10 to 45 parts to one hundred parts of the composition while a preferred dry weight of the mixture to one hundred parts of the composition being in the range between 35 to 45 parts. The dry weight ratio of sulfate of ammonia to hydrated alumina in the mixture is not less than 2.5 to 1, while the dry weight ratio of hydrated alumina to zinc borate in the mixture is about equal. The preferred composition would include added water in an amount between 55 to 60 parts per hundred parts of composition. Likewise, the dispersing agent would preferably be present in the range of about 0.3 to 0.6 weight percent of the composition.

In a preferred composition the pH level of the composition will be in the range between 6.5 and 7. Likewise, the average granular size of the finely divided hydrated alumina and zinc borate is preferably between 5 to 6 microns.

The foregoing composition exhibits a viscosity similar to that of an ordinary latex paint, and can be applied by any of the methods known for applying such paint, for example, but not limited to, spraying brushing, dipping, rollers, and the like.

The following example, which is meant to be illustrative and not limiting, is provided to further describe the present invention and to detail the performance characteristics under test conditions for a coating formed by drying the present composition on a substrate. In this example, the parts given are by weight.

EXAMPLE I

A standard flame spread and smoke density developed classification tests were performed on the fire retardant composition in accordance with ASTM Designation E84, "Standard Method of Test for Surface Burning Characteristics of Building Materials."

A coating mix is prepared by compounding in a mixer the following formulation in parts by weight:

| | |
|---|---|
| water | 10.0–17.5 Oz. |
| sulfate ammonia | 1.5–5.0 Oz. |
| hydrated alumina | 1.0–3.0 Oz. |
| zinc borate | 1.0–3.0 Oz. |

The order in which materials are added to the mixer is not important with respect to the fire retardant properties attained, but to obtain good dispersion, the mixture should be made in the following order: water, sulfate ammonia, powdered inorganics, dispersant, thickener. The mixture was agitated for a sufficient time to obtain a smooth, complete dispersion of the materials with respect to one another. The final mixture was applied to test decks consisting of select grade red oak flooring made from nominal 1"×3" slats. The coverage rate was one coat brush applied at 200 square feet per gallon of mixture.

Three decks 2 feet wide by 8 feet long constructed of nominal 1"×3" select grade red oak flooring were prepared by brush applying the fire retardant composition to the test decks in one coat at a rate of 200 square feet per gallon. After a 24 hour drying period, the test panels were placed in the conditioning room (maintained at a temperature of 73.4+/−5 degrees Fahrenheit, and a relative humidity of 50% +/−5%) and allowed to reach moisture equilibrium.

The sample was tested following calibration and preheating of the test chamber. The evaluation was performed in conformance with the specifications set forth in ASTM Designation E84, "Standard Method of Test for Surface Burning Characteristics of Building Materials", both as to equipment and test procedure. Both the test procedure and apparatus used have been accredited under the National Bureau of Standards/NVLAP Program and the foregoing test procedure is comparable to UL 723, NFPA No. 255, and UBC No. 42-1.

The coated test decks were subject to testing in accordance with the test procedures discussed above to provide the following results:

TREATED TEST DECKS

IGNITION TIME: 59 seconds
FLAME FRONT: 19.5 feet maximum
TIME TO MAXIMUM SPREAD: 9 minutes, 7 seconds
TEST DURATION: 10 minutes
OBSERVATIONS: Surface discoloration and slight charring preceded sample ignition. A steady flame front advance extended the full sample length in a total test time of 9 minutes, 7 seconds. Surface peeling was noted at 6 minutes, 45 seconds. Peak smoke production was recorded at 10 minutes.

UNTREATED TEST DECKS

IGNITION TIME: 52 seconds
FLAME FRONT: 19.5 feet maximum
TIME TO MAXIMUM SPREAD: 5 minutes, 15 seconds
TEST DURATION: 10 minutes
OBSERVATIONS: Discoloration, then charring of the sample surface was observed in the direct flame impingement area prior to ignition. Following ignition, the flame front steadily advanced the length of the test chamber in 5 minutes, 15 seconds. Peak smoke evolution was recorded at 3 minutes, 10 seconds. Considerable after-burning of the sample was noted at the conclusion of the test.

From the results determined from the preceding example, it is apparent the present formulation yields a substantially superior flame-retardant coating.

While the composition of the invention has been described, in the examples, as being applied to wood, it is to be understood that it may be applied to a wide variety of substrates possessing various degrees of flammability, for example, fabric and other wall coverings and the like.

It will thus be seen that the objects set forth above, among those made apparent by the preceding description, are efficiently obtained. Since certain changes may be made in the composition and articles set forth in the example, without departing from the scope of this invention, it is intended that all matter contained in the above description shall be interpreted as illustrative and not in a limiting sense.

What is claimed is:

1. A coating composition suitable for application to a substrate for curing thereon to form a fire-retardant coating, said composition comprising in combination:
   an aqueous emulsion of sulfate of ammonia, the ratio of the dry weight of said sulfate of ammonia being in the range between about 14.5 to 24 parts to one hundred parts of the composition;
   dispersed in said emulsion, finely divided hydrated alumina in a weight ratio of about 8 to 13 parts per one hundred parts of said composition; and,
   dispersed in said emulsion, finely divided zinc borate in a weight ratio of about 8 to 13 parts per one hundred parts of said composition.

2. A composition as defined in claim 1 including added water in an amount between 55 to 60 parts per hundred parts of said composition.

3. A composition as defined in claim 2 including a thickening agent present in an amount sufficient to maintain said finely divided hydrated alumina and said finely divided zinc borate in suspension in said composition.

4. A composition as defined in claim 3 wherein said thickening agent is present, in a ratio, by dry weight, of between approximately 0.2 to 1 part per hundred of said composition.

5. A composition as defined in claim 3 wherein said thickening agent is a cross-linked acrylic copolymer emulsion.

6. A composition as defined in claim 2 including a dispersing agent present in sufficient amount to impart fluidity to said composition and to enhance dispersion of said finely divided hydrated alumina and said finely divided zinc borate in said composition.

7. A composition as defined in claim 6 wherein said dispersing agent is present in about 0.3 to 0.6 weight percent of said composition.

8. A composition as defined in claim 6 wherein said dispersing agent is an alkali salt of a carboxylate polyelectrolyte.

9. A coating composition suitable for application to a substrate for curing thereon to form a fire-retardant coating, said composition comprising in combination:
   an aqueous emulsion containing a mixture of sulfate of ammonia, finely divided hydrated alumina and finely divided zinc borate, the dry weight of said mixture to one hundred parts of the composition being in the range between 35 to 45 parts,
   the dry weight ratio of sulfate of ammonia to hydrated alumina in said mixture being not less than 4.5 to 1, and,
   the dry weight ratio of hydrated alumina to zinc borate in said mixture being about equal.

10. A composition as defined in claim 9 including added water in an amount between 55 to 60 parts per hundred parts of said composition.

11. A composition as defined in claim 10 including a thickening agent present in an amount sufficient to maintain said finely divided hydrated alumina and said finely divided zinc borate in suspension in said composition.

12. A composition as defined in claim 11 wherein said thickening agent is present, in a ratio, by dry weight, of between approximately 0.2 to 1 part per hundred of said composition.

13. A composition as defined in claim 11 wherein said thickening agent is a cross-linked acrylic copolymer emulsion.

14. A composition as defined in claim 10 including a dispersing agent present in sufficient amount to impart fluidity to said composition and to enhance dispersion of said finely divided hydrated alumina and said finely divided zinc borate in said composition.

15. A composition as defined in claim 14 wherein said dispersing agent is present in about 0.3 to 0.6 weight percent of said composition.

16. A composition as defined in claim 14 wherein said dispersing agent is an alkali salt of a carboxylate polyelectrolyte.

17. A composition as defined in claim 9 wherein the pH level of said composition is in the range between 6.5 and 7.

18. A composition as defined in claim 9 wherein the average granular size of said finely divided hydrated alumina is between 5 to 6 microns.

19. A composition as defined in claim 9 wherein the average granular size of said finely divided zinc borate is between 5 to 6 microns.

* * * * *